United States Patent [19]

Hashiguchi

[11] Patent Number: 5,552,799
[45] Date of Patent: Sep. 3, 1996

[54] DISPLAY INFORMATION CONVERSION APPARATUS

[75] Inventor: Sadao Hashiguchi, Yokohama, Japan

[73] Assignee: Nintendo Co.,Ltd., Kyoto, Japan

[21] Appl. No.: 280,207

[22] Filed: Jul. 25, 1994

[30]       Foreign Application Priority Data

Jul. 27, 1993  [JP]  Japan .................................. 5-204739
Jan. 25, 1994  [JP]  Japan .................................. 6-006104

[51] Int. Cl.⁶ .................................................. G09G 5/12
[52] U.S. Cl. ........................ 345/3; 345/132; 273/148 B
[58] Field of Search ............................ 345/132, 153–155, 345/3; 273/433–438, 148 B, DIG 28; 395/128

[56]                    References Cited

U.S. PATENT DOCUMENTS 4,855,728   8/1989   Mano ......................................... 345/3
5,112,051   5/1992   Darling et al. ....................... 273/148 B
5,203,848   4/1993   Wang ......................................... 273/435
5,282,621   2/1994   Tseng ................................... 273/148 B
5,395,112   3/1995   Darling ................................. 273/148 B

*Primary Examiner*—Jeffery Brier
*Attorney, Agent, or Firm*—Nixon & Vanderhye

[57]                         ABSTRACT

A display information conversion apparatus includes a game process circuit (104) by which a game program stored in a memory (32) of a memory cartridge (30) for a first game machine is executed, the game process circuit (104) is approximately the same as that of the first game machine. Bit-serial dot data is outputted from the game process circuit (104), and converted into bit-parallel character data by a digital video data interface (114), and the character data is written in a buffer RAM (116). The character data is transferred to a second game machine coupled to a raster-scan display through a connector (113), so that a game image according to the game program stored in the memory is displayed on the raster-scan display.

9 Claims, 21 Drawing Sheets

FIG.7

CONTROLLER DATA

| A BUT-TON | B BUT-TON | LEFT SW. | RIGHT SW. | | | | |
|---|---|---|---|---|---|---|---|
| 408 | 404 | 418 | 416 | | | | |

| B BUT-TON | Y BUT-TON | SELECT SW. | START SW. | CROSS-KEY SW. 402 | | | |
|---|---|---|---|---|---|---|---|
| 410 | 406 | 412 | 414 | UP | DOWN | LEFT | RIGHT |

FIG.9

| A BUT-TON | B BUT-TON | SELECT SW. | START SW. | | | | |
|---|---|---|---|---|---|---|---|
| | | | | UP | DOWN | LEFT | RIGHT |

F I G. 13
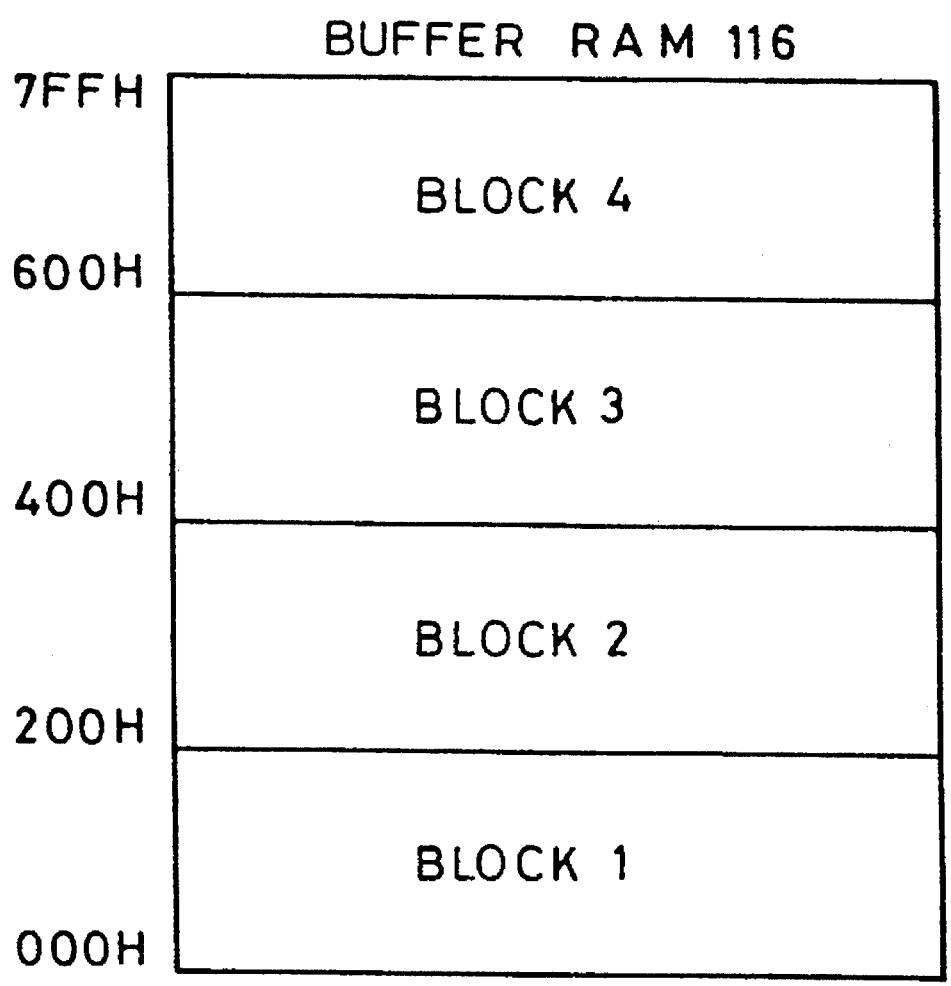

FIG. 14

W-RAM 212

| ADDRESS | DATA |
|---|---|
| 0 | FRAME BUFFER 1 (5760 BYTE) |
| 5759 | |
| 5760 | FRAME BUFFER 2 (5760 BYTE) |
| 11519 | |
| 11520 | COLOR DATA 0 (2 BYTE) |
| 11522 | COLOR DATA 1 (2 BYTE) |
| 11524 | COLOR DATA 2 (2 BYTE) |
| 11526 | COLOR DATA 3 (2 BYTE) |

FIG. 15

|  | PLANE 1 | | | | | | | | |
|---|---|---|---|---|---|---|---|---|---|
| PLANE 0 | d7 | d6 | d5 | d4 | d3 | d2 | d1 | d0 | n+1 |
| n | d7 | d6 | d5 | d4 | d3 | d2 | d1 | d0 | n+3 |
| n+2 | d7 | d6 | d5 | d4 | d3 | d2 | d1 | d0 | n+5 |
| n+4 | d7 | d6 | d5 | d4 | d3 | d2 | d1 | d0 | n+7 |
| n+6 | d7 | d6 | d5 | d4 | d3 | d2 | d1 | d0 | n+9 |
| n+8 | d7 | d6 | d5 | d4 | d3 | d2 | d1 | d0 | n+11 |
| n+10 | d7 | d6 | d5 | d4 | d3 | d2 | d1 | d0 | n+13 |
| n+12 | d7 | d6 | d5 | d4 | d3 | d2 | d1 | d0 | n+15 |
| n+14 | d7 | d6 | d5 | d4 | d3 | d2 | d1 | d0 | |

FIG. 18

PROGRAM ROM 122

| ADDRESS | | |
|---|---|---|
| 0 | COLOR DATA 0 0 | ⎫ USER'S COLOR 0 |
| 2 | COLOR DATA 0 1 | |
| 4 | COLOR DATA 0 2 | |
| 6 | COLOR DATA 0 3 | ⎭ |
| 8 | COLOR DATA 1 0 | ⎫ USER'S COLOR 1 |
| 10 | COLOR DATA 1 1 | |
| 12 | COLOR DATA 1 2 | |
| 14 | COLOR DATA 1 3 | ⎭ |
| ⋮ | ⋮ | |
| 8m | COLOR DATA m 0 | ⎫ USER'S COLOR m |
| 8m+2 | COLOR DATA m 1 | |
| 8m+4 | COLOR DATA m 2 | |
| 8m+6 | COLOR DATA m 3 | ⎭ |

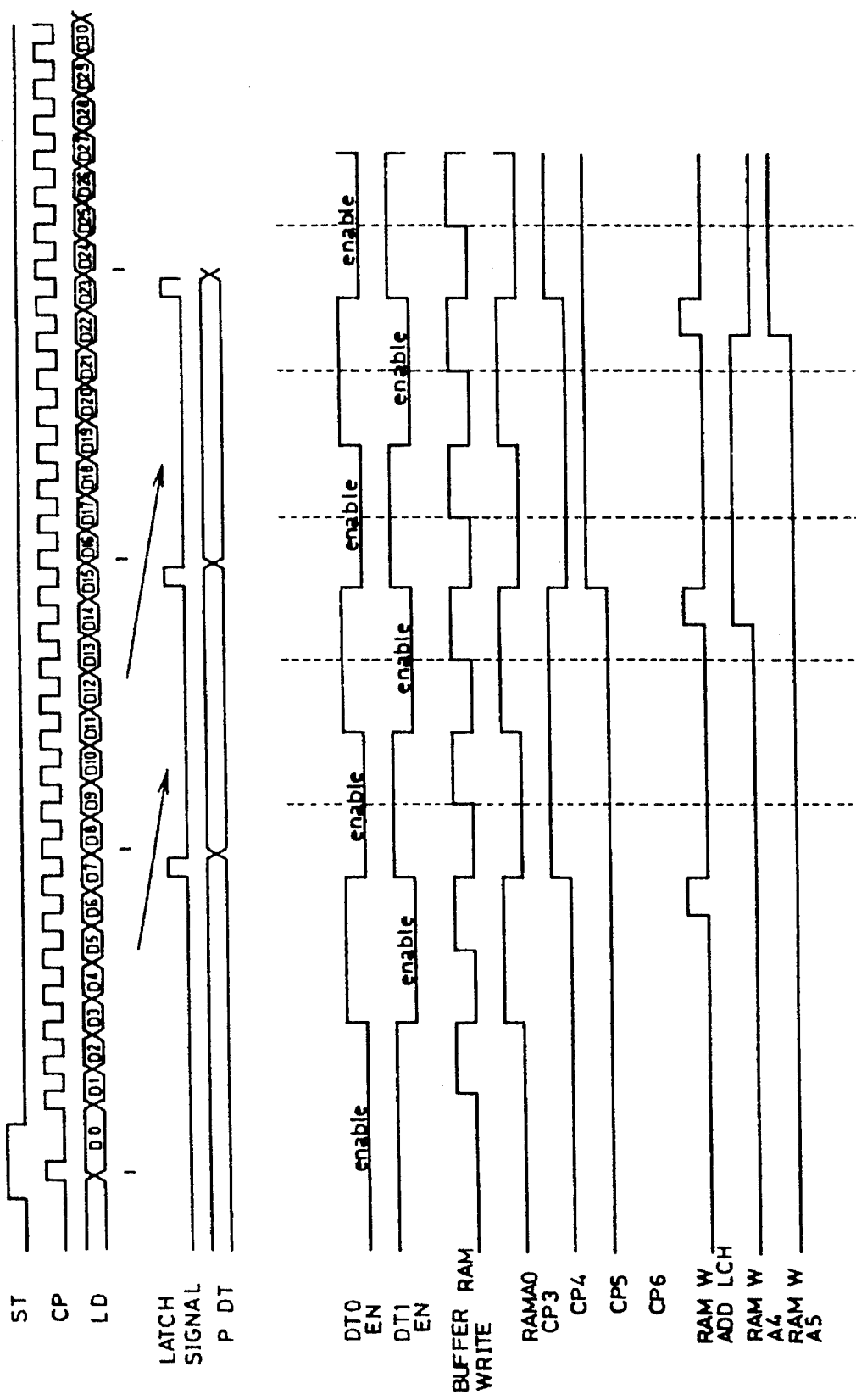

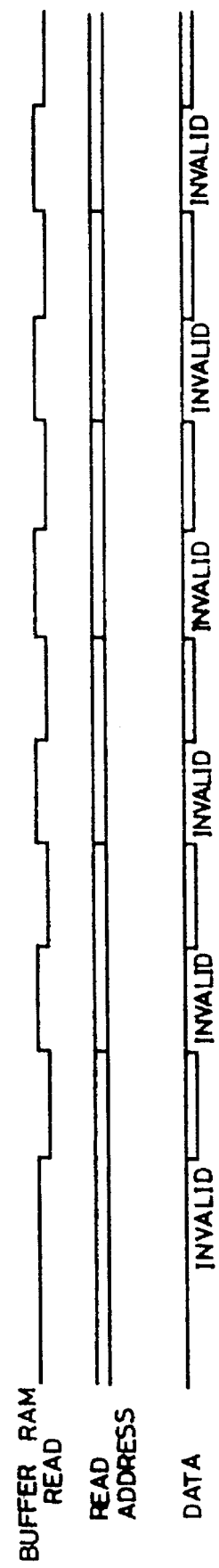

DISPLAY INFORMATION CONVERSION APPARATUS

BACKGROUND OF THE INVENTION

1. Field of the Invention

The present invention relates to a display information conversion apparatus. More specifically, the present invention relates to a novel display information conversion apparatus for making a storage medium for storing a first program executed by a first information processing apparatus which is constructed so as to display an image on a dot-matrix display to be applied to a second information processing apparatus which is constructed so as to display an image on a raster-scan display, and an information processing system which utilizes such a display information conversion apparatus.

Furthermore, the present invention relates to a novel display information conversion apparatus for making a storage medium for storing a first program executed by a first information processing apparatus which is constructed so as to display an image according to a first specification to be applied to a second information processing apparatus constructed so as to display an image according to a second specification in which an image quality is higher than that of the first specification.

2. Description of the Prior Art

As one example of such a kind of first information processing apparatus, a dot-matrix liquid crystal game machine which has been put into a commercial market as a name of "Game Boy (trademark)", for example, is well known. Furthermore, as one example of such a kind of second information processing apparatus, a television game machine which has been put into a commercial market as a name of "Super Nintendo Entertainment System (trademark)", for example, is well known.

In the above described "Game boy" and "Super Nintendo Entertainment System", signal processing specifications (formats) are different from each other, even if sizes etc. of memory cartridges are made equal to each other, a memory cartridge for one of the both can not be applied to the other of the both. Therefore, a user must have different kind of game machines, and manufacturers of memory cartridges must manufacture memory cartridges separately for respective game machines even if a game content is the same.

SUMMARY OF THE INVENTION

Therefore, a principal object of the present invention is to provide a novel display information conversion apparatus for making a storage medium which stores a first program capable of being executed by a first information processing apparatus which is constructed so as to display an image on a dot-matrix display to be applied to a second information processing apparatus which is constructed so as to display an image on a raster-scan display.

Another object of the present invention is to provide an information processing system which includes the above described display information conversion apparatus.

Another object of the present invention is to provide a novel display information conversion apparatus for making a storage medium which stores a first program capable of being executed by a first information processing apparatus which is constructed so as to display an image according to a first specification or format to be applied to a second information processing apparatus which is constructed so as to display an image according to a second specification or format in which an image quality becomes higher than that of the first specification.

A display information conversion apparatus according to the present invention is an apparatus for making a storage medium which stores a first program executed by a first information processing apparatus which is constructed so as to display an image on a dot-matrix display to be applied to a second information processing apparatus which is constructed so as to display an image on a raster-scan display, and comprises: a first connection portion to which the storage medium is detachably attached; a second connection portion for detachably attaching the display information conversion apparatus to a second information processing apparatus; information processing means for executing the first program stored in the storage medium attached to the first connection portion to generate first video image information capable of being displayed on the dot-matrix display; video image converting means for converting the first video image information into second video image information capable of displayed on the raster-scan display; and transfer means for transferring the second video image information converted by the video image converting means to the second information processing apparatus via the second connection portion.

A display information conversion apparatus according to the present invention is an apparatus for making a storage medium which stores in a non-volatile manner a first program capable of being executed by a first information processing apparatus which is constructed so as to display an image according to a first specification or format to be applied to a second information processing apparatus which is constructed so as to display an image according to a second specification or format, and comprises: a first connection portion to which the storage medium is detachably attached; a second connection portion for detachably attaching the display information conversion apparatus to a second information processing apparatus; information processing means for executing a first program stored in the storage medium attached to the first connection portion; video image information generating means for generating video image information of the first specification or format on the basis of a processed result by the information processing means; video image converting means for converting the video image information of the first specification or format into video image information of the second specification; and transfer means for transferring the video image information of the second specification or format converted by the video converting means to second information processing apparatus via the second connection portion.

In a case where the first information processing apparatus is a dot-matrix display game machine, for example, the second information processing apparatus is a raster-scan display game machine, for example, the information processing means executes the first program and outputs dot data as the first video image information. The dot data is converted into character data, for example, by the video image converting means. The character data is temporarily stored in a buffer memory, for example, and read-out by the second information processing apparatus. The character data is processed by the second information processing apparatus. More specifically, a program for only the second information processing apparatus is applied to the second information processing apparatus, and therefore, the game converts the character data into a video signal for the raster-scan display in accordance with the program. Therefore, when the character data is applied to the second information processing apparatus from the display information conversion apparatus, the video signal for the raster-scan display can be obtained from the second information processing apparatus. Thus, the first program for the dot-matrix display game machine can be executed by the raster-scan display game machine.

In a case where the first information processing apparatus is a game machine which generates a video image according to the first specification or format wherein an image quality is relatively low, for example, and the second information processing apparatus is a game machine which generates a video image according to the second specification of a format wherein an image quality is higher than that of the first specification or format, the information processing means executes the first program, and the video image information generating means outputs three (3) dot data of red (R), green (G) and blue (B), for example, as the first video image information on the basis of a processed result by the information processing means. The dot data are converted into character data, for example, by the video image converting means. The character data is temporarily stored in a buffer memory, for example, and read-out by the second information processing apparatus via the transfer means. The character data is processed by the second information processing apparatus. More specifically, a program for the second information processing apparatus only is applied to the second information processing apparatus, and therefore, the character data is converted into the video signal according to the second specification or format having a higher image quality by the second information processing apparatus according to the program. Therefore, when the character data is applied to the second information processing apparatus from the display information conversion apparatus, the video signal according to the second specification having a higher image quality can be obtained. Thus, the first program for the game machine which generates a video image according to the first specification or format of a relatively low image quality can be executed by the game machine which generates a video image according to the second specification or format of a relatively high image quality.

In accordance with the present invention, the storage medium having the first program for the first information processing apparatus can be processed by the second information processing apparatus, and therefore, it becomes unnecessary to separately prepare programs for the first information processing apparatus and the second information processing apparatus.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 7 is an illustrative view showing a data format of controller data obtained from a controller shown in FIG. 1;

FIG. 9 is an illustrative view showing a data format of controller data applied to a game process circuit shown in FIG. 8;

FIG. 13 is an illustrative view showing a memory map of FIG. 8 or FIG. 11;

FIG. 14 is an illustrative view showing a memory map of a working RAM shown in FIG. 10;

FIG. 15 is an illustrative view showing character data written in the working RAM shown in FIG. 14;

FIG. 18 is an illustrative view showing color data included in a program ROM shown in FIG. 8;

FIG. 21 is a timing chart showing a writing the data into a buffer RAM; and

FIG. 22 is a timing chart showing a reading-out the data from the buffer RAM.

DETAILED DESCRIPTION OF THE PREFERRED EMBODIMENTS

Figure 1:
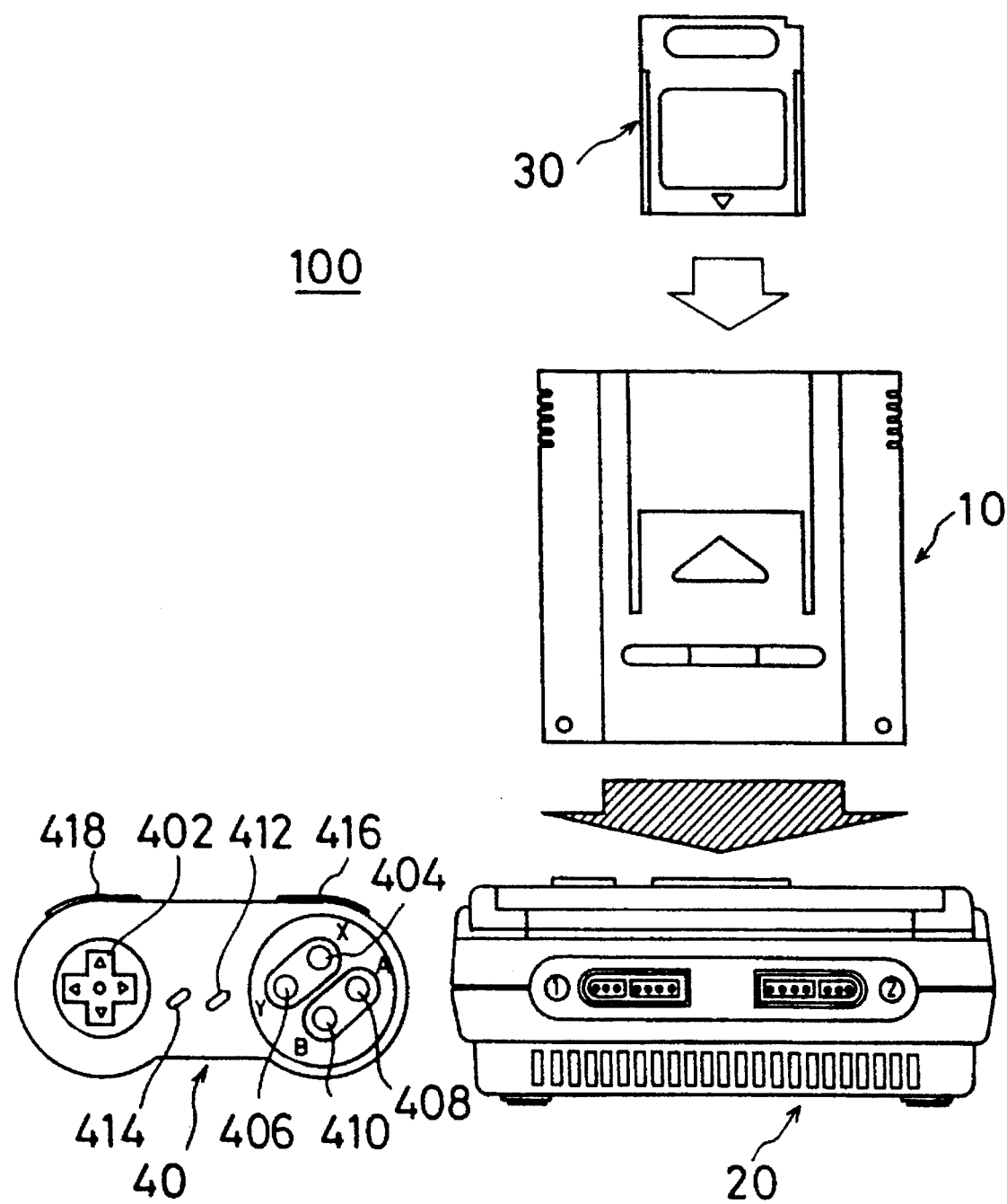
FIG. 1 is an illustrative view showing one embodiment according to the present invention.

A game system 100 of an embodiment shown in FIG. 1 constitutes one example of an information processing system, which includes an adapter 10, and the adapter 10 constituting one example of a display information conversion apparatus. The adapter 10 is detachably attached to a game machine 20 which displays a game image on a raster-scan type display such as a monitor television (not shown). The game machine 20 is "Super Nintendo Entertainment System (trademark)", for example. On the other hand, a memory cartridge 30 is detachably attached to the adapter 10. The memory cartridge 30 is originally applied to a game machine 300 shown in FIG. 2, which displays a game image on a dot-matrix liquid crystal display. The game machine 300 is "Game Boy (trademark)", for example. Then, in the game system 100 of this embodiment shown, the adapter 10 to which the memory cartridge 30 is detachably attached is detachably attached to the game machine 20, and by operating a controller 40 which is connected to the game machine 20, a game can be played by the game machine 20 according to a game program stored in the memory cartridge 30. At this time, the game image is displayed on the raster-scan display or monitor television (not shown) which is connected to the game machine 20.

Figure 2:
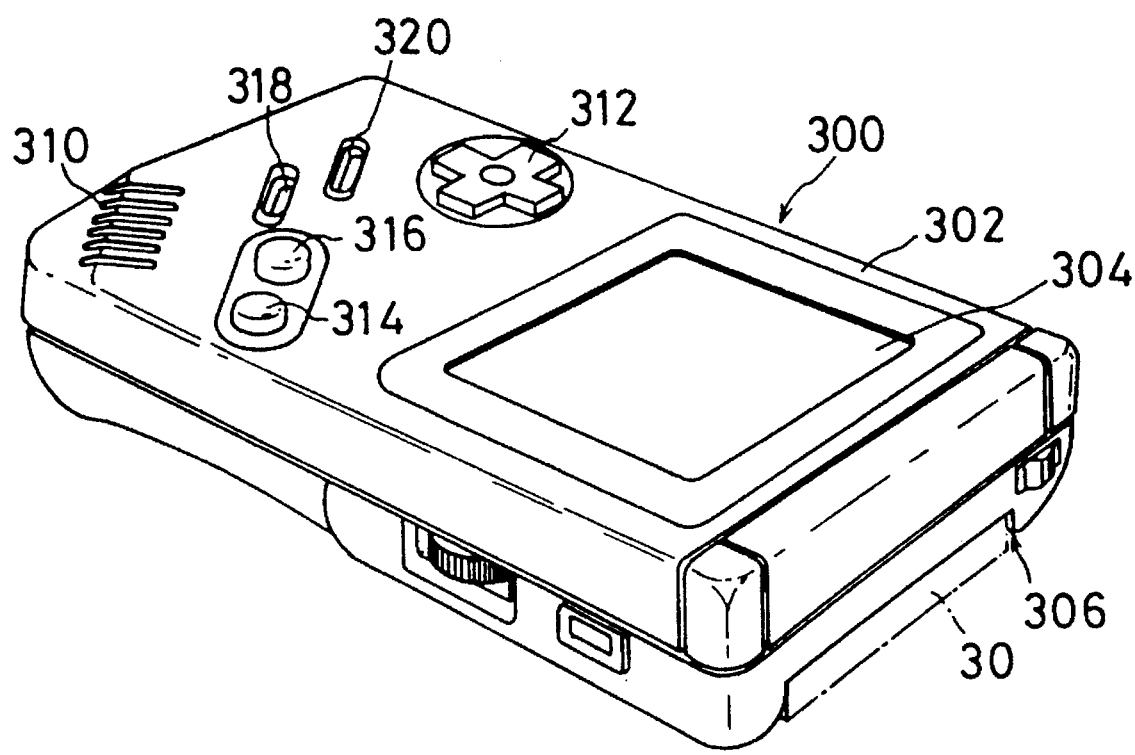
FIG. 2 is a perspective view showing one example of a game machine by which a memory cartridge shown in FIG. 1 is utilized.
Figure 3:
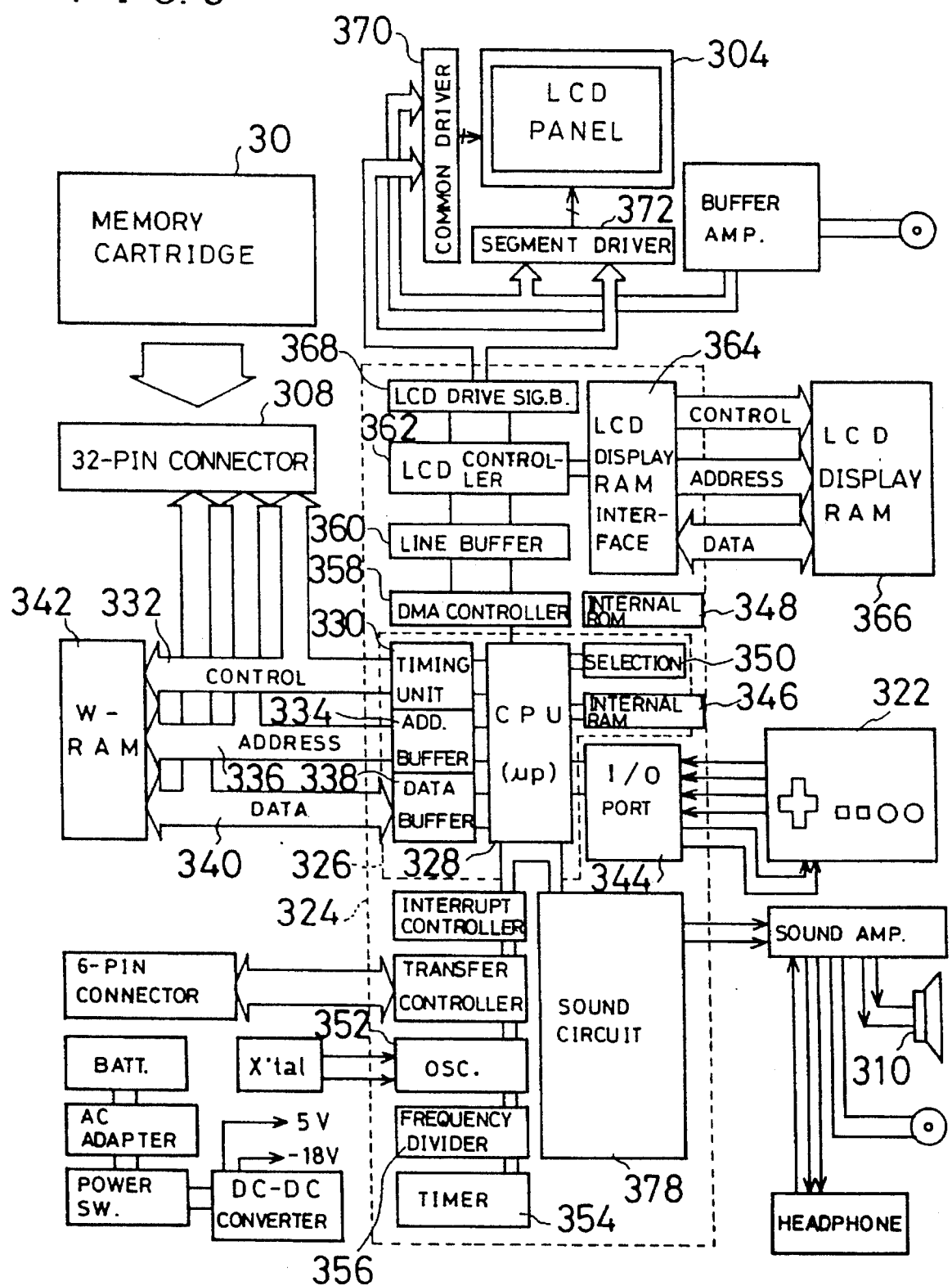
FIG. 3 is a block diagram showing structure of the game machine shown in FIG. 2.

Now, with referring FIG. 2, the game machine 300 will be described within a range necessary for understanding the present invention. The game machine 300 includes a case 302 which is provided with an LCD panel 304 including dot display segments being arranged in accordance with a dot-matrix system on a front and upper surface thereof. On a rear and upper surface of the case 302, an insertion port 306 is formed at a portion opposite to the LCD panel 304. An external memory or memory cartridge 30 is pluggably inserted in the insertion port 306. More specifically, a 32-pin connector 308 (FIG. 3) is provided in the insertion port 306, and by inserting the memory cartridge 30 into the insertion port 306, a connector (not shown) formed at an edge of a printed circuit board accommodated in the memory cartridge 30 is inserted and connected to the connector 308. Therefore, the memory cartridge 30 can be attachably/detachably connected to the game machine 300. A game program is stored in an external memory 32 (FIG. 4 and FIG. 8) included in the memory cartridge 30. When the memory cartridge 30 is loaded in the game machine 300, the game program is executed such that a game image is displayed on the LCD panel 304 and music for the game is generated at a speaker 310 (FIG. 1 and FIG. 3).

A cross-key switch 312 is provided on a front and lower surface of the case 302, and the cross-key switch 312 is utilized for designating movement of a game character being displayed on the LCD panel 304 in four (4) directions of "up", "down", "left" and "right". Push-button switches 314 and 316 are provided on the front and lower surface of the case 302 at a right portion of the cross-key switch 312, and by operating the push-bottom switches 314 and 316, it is possible to perform for a game character being displayed on the LCD panel 304 various predetermined actions such as use of weapon, jump and etc. In addition, a start switch 318 and a select switch 320 provided between the cross-key switch 312 and the push-button switch 316 are depressed for starting the game playing and for selecting a game mode and etc. Then, these key or switches 312–320 are connected to a key matrix 322 (FIG. 3), and the key matrix 322 gives operation signals of the switches 312–320 to a CPU 326 included in a game process circuit 324 as controller data.

The CPU 326 includes a CPU core 328 such as a microprocessor of "Z80", for example, and the CPU core 328 is connected to a timing unit 330, and the 32-pin connector 308 and a working RAM 342 of 64 Kbits, for example, via a control bus 332, an address buffer 334 and an address bus 336, and a data buffer 338 and a data bus 340. Therefore, when the memory cartridge 30 is loaded to the game machine 300, the CPU core 328 and the external memory 32 included in the memory cartridge 30 are coupled to each other.

In addition, the CPU core 328 includes registers A, F, B, C, D, E, H and L each of which is a register of 8 bits, except for program counter PC and stack pointer SP which are 16 bit registers, respectively. The register A is an accumulator and the register F is a flag register. By using 4 bits of the 8 bits of the register F, it is possible to indicate F1 (carry), F2 (half carry), F3 (negative), or F4 (zero flag). The registers B and C, D and E, and H and L may be combined and used as registers of 16 bits. The CPU 326 preferably has an associated instruction set permitting a variety of 8 and 16 bit data transfers between registers or register pairs, a variety of 8 and/or 16 bit arithmetic operations (for example, ADD, SUB, AND, OR, INC, DEC, etc.), a variety of rotate/shift operations (for example, rotate specified register contents left/right), a variety of bit control operations (for example, setting a specified bit in a specified register), conditional and unconditional blanch operations, sub-routine call and return operations, and a variety of program control operations (for example, start, stop, not operation, etc.).

Turning back to FIG. 3, the above described key matrix 322 is connected to the CPU core 328 via an I/O port 344. The CPU core 328 is also connected to an internal RAM 346 and an internal ROM 348. The internal ROM 348 can be accessed by the CPU core 328 only when the internal ROM 348 is selected by a memory selecting circuit 350. Clock pulses are supplied by an oscillator circuit 352, and the clock pulses are frequency-divided by a frequency divider 356 under control of a timer 354, and then applied to the CPU 326 as a clock pulse (CP) therefor.

Figure 5:
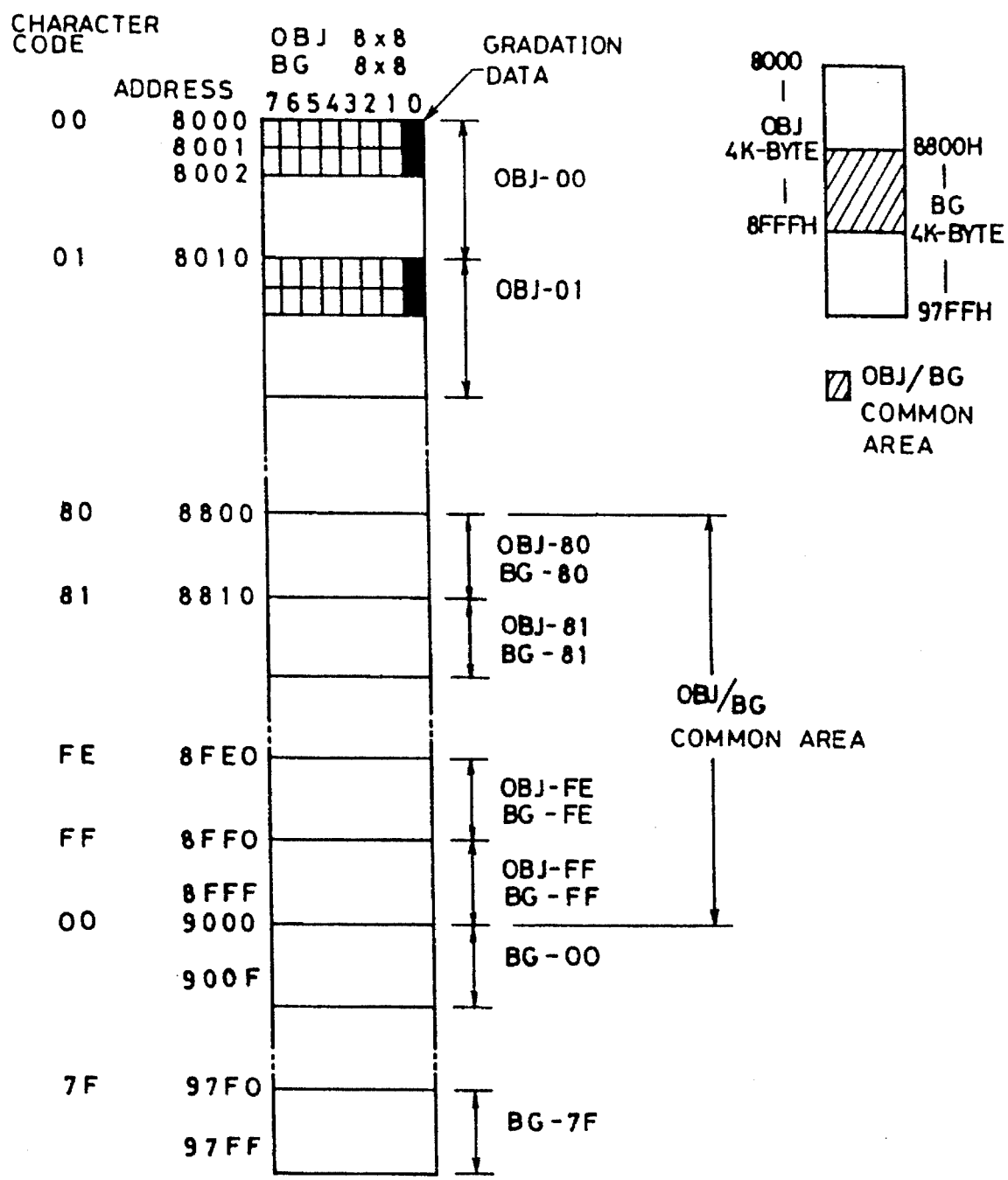
FIG. 5 is an illustrative view showing a memory map of a character RAM shown in FIG. 3.
Figure 6:
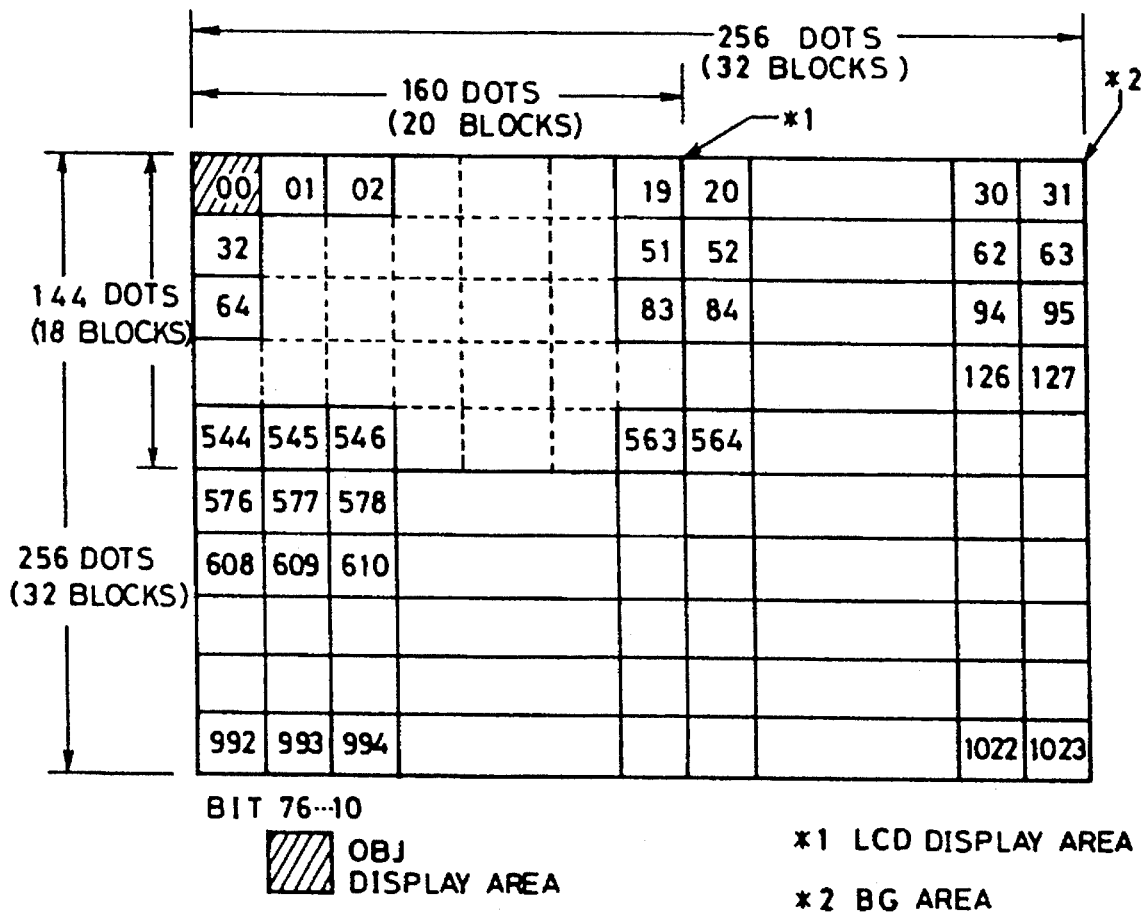
FIG. 6 is an illustrative view showing a memory map of a VRAM shown in FIG. 3.

The CPU core 328 outputs display data to an LCD controller 362 via a line buffer 360 under control of a DMA controller 358. The LCD controller 362 is connected to a display RAM 366 via an LCD display RAM interface 364, and control, address and data buses, the LCD display RAM 366 being formed by an SRAM of 64 Kbits, for example. The display RAM 366 includes a character RAM and a VRAM. A memory map of the character RAM is shown in FIG. 5, and a memory map of the VRAM is shown in FIG. 6. The VRAM includes 1024 (=32×32) blocks of character code representing background display data. Only 360 (18× 20) of the 1024 blocks are displayed on the LCD screen at any particular time, the selected area to be displayed can be changed by changing the data in the vertical and horizontal scroll register (SCY and SCX) of the LCD controller 362.

The LCD controller 362 operates under control of the CPU 326 via various address subroutine control/status registers which are located in the CPU address space. These registers includes an LCD display register, LCD controller status register, horizontal and vertical scroll registers, LCD vertical line identification register, and moving object and background pallet data (for example, 2 bits identifying 1 of 4 gradations of shaded color data). The LCD display register controls the nature of the display, and the status register indicates the current status of the LCD controller 362. Every dot of the background display data is available by changing the data of the horizontal vertical scroll registers. LY and LYC registers indicate and control the vertical line to which data is presently being transferred by way of the display drivers. The X and Y window position registers control that portion or window of the LCD display area in which the moving object character as well as the background character data appears.

The LCD controller 362 converts display related data outputted from the CPU core 328 into an LCD drive signal which is outputted from the display RAM 366. More specifically, the display data from the CPU core 328 designates addresses of the character RAM and the VRAM (video RAM) such that a character (or object) signal and a background signal are outputted from the character RAM and the VRAM. Respective LCD drive signals are composed by the LCD controller 362.

The LCD drive signals are applied to an LCD common driver 370 and an LCD segment driver 372 through an LCD drive signal buffer 368. Therefore, by means of the LCD common driver 370 and tile LCD segment driver 372, a video image in accordance with the display related data from the CPU core 328 can be displayed on the LCD panel 304. Pixels or dots of the LCD panel 304 are corresponding to intersecting points of common electrodes and segment electrodes. Then, the LCD common driver 370 drives the lines connected to the electrodes. These drivers 370 and 372 receive data indirectly from the CPU 326 via the display RAM 366, the display RAM interface 364 and the LCD controller 362.

Figure 4:
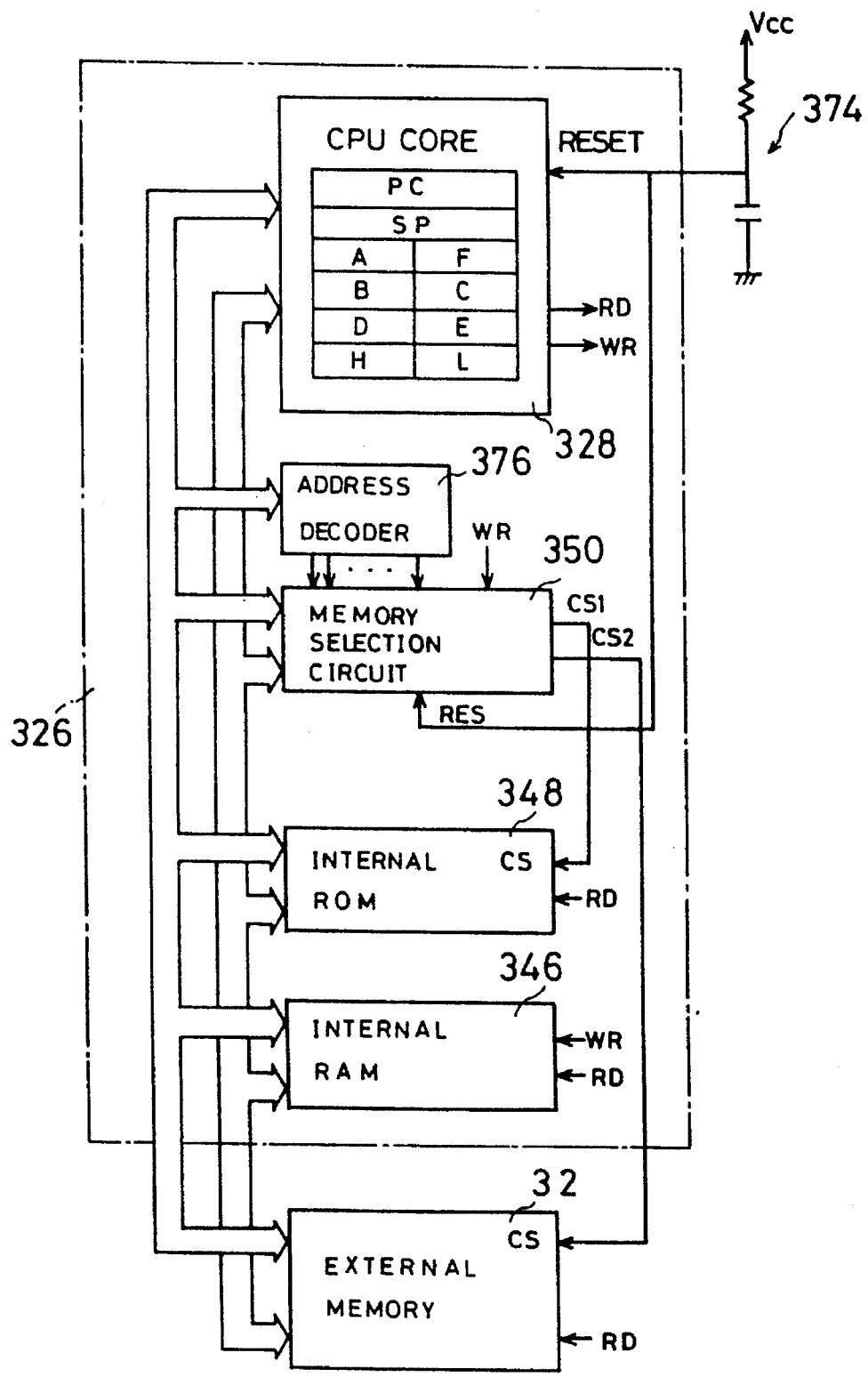
FIG. 4 is a block diagram showing a CPU shown in FIG. 3 in more detail.

In addition, as shown in FIG. 4, a chip select signal CS1 or CS2 is outputted from the memory selecting circuit 350. A reset signal from a reset circuit 374 is applied to the CPU core 328 and the memory selecting circuit 350. The reset signal is outputted when a power switch (not shown) of the game machine 300 is turned-on, and therefore, the CPU core 328 and the memory selecting circuit 350 are initially reset at that time. Then, a read signal RD and a write signal WR are outputted from the CPU core 328, which are suitably inputted to the external memory 32, the internal RAM 346, the internal ROM 348 and the memory selecting circuit 350. Then, an address decode signal is given to the memory selecting circuit 350 via an address decoder 376.

Returning to FIG. 3, the game process circuit 324 of the game machine 300 further includes a sound circuit 376 by which a sound signal of music and effect sound necessary for game is generated. More specifically, the CPU core 328 controls the sound circuit 378 in accordance with the game program included in the external memory 32 of the memory cartridge 30, whereby the necessary sound signal is outputted from the sound circuit 378.

Now, a whole operation of the game machine 300 will be described. After the power switch (not shown) is turned-on, a predetermined initialization process is executed, and thereafter, the CPU core 328 transfers background character data (dot data) to the character RAM (FIG. 5) included in the LCD display RAM 366 in accordance with the program data stored in the external memory 32 of the memory cartridge 30. At the same time, the background pallet data and the character code which designates the background character to be displayed on the LCD panel 304 and display position thereof are transferred to the VRAM (FIG. 6) included in the LCD display RAM 366. Furthermore, the CPU 328 reads the character code of the moving object character displayed on a single screen, display coordinate data and the attribute data from the external memory 32, and applies the same to the LCD controller 362 via the DMA controller 358 and the line buffer 360. In response thereto, the LCD controller 362 executes the processing for displaying a video image in which the background character and the moving object character are combined with each other on the LCD panel 304. More specifically, the composite data in which the character data of the moving objects of one line and the background character data stored in the VRAM are combined to each other are temporarily stored in the LCD drive signal buffer 368. Then, the LCD controller 362 sequentially applies the dot data to the drivers corresponding to the dot positions in a direction of line. More specifically, the LCD controller 362 applies row selecting data to the LCD segment driver 372, and the data fop sequentially selecting the columns of the respective lines to the LCD common driver 370. The dots where both the row and column are selected are driven for a short time period. In other words, data representative of whether or not the respective dots of the object characters and the background character are to be driven to display are applied to the LCD segment driver 372 and the common driver 370, whereby the composite video image can be display on the LCD panel 304. By repeating such operations, in a high-speed, sequential manner, the driven dots are displayed by the density or contrast being different from that of other dots.

Thus, a video signal (dot data) and the sound signal are outputted from the game process circuit 324 of the game machine 300. That is, the dot data is applied to the LCD common driver 370 and the LCD segment driver 327 from the LCD controller 362 included in the game process circuit 324 (FIG. 3), and the sound signal from the sound circuit 378 is applied to the speaker 310.

The memory cartridge 30 utilized for the above described game machine 300 is attached to the adapter 10 which is further attached to the game machine 20. Therefore, a player can play a game according to the game program stored in the memory cartridge 30 by the game machine 20 by utilizing the controller 40.

The controller 40 includes a cross-key switch 402 similar to the cross-key switch 312 of the game machine 300, and the game character can be moved in four directions (up, down, left and right) by the cross-key switch 402. The controller 40 further includes push button switches 404, 406, 408 and 410. The push button switches 404, 406, 408 and 410 are corresponding to the push button switches 314 and 316 of the game machine 300. The controller 40 further includes a start switch 412 and a select switch 414, and the start switch 412 is utilized for starting the game, and the select switch 414 is utilized for selecting the game mode, for example. The controller 40 further includes a right switch 416 and a left switch 418. Therefore, controller data as shown in FIG. 7 is inputted to the game machine 20 from the controller 40.

The adapter 10 is an adapter for making the memory cartridge 30 for the game machine 300 to be applied to the game machine 30, and the game includes a 32-pin connector 102 similar to the 32-pin connector 308 of the dame machine 300. The memory cartridge 30 which incorporates the external memory 32 is detachably attached to the 32-pin connector 102. The connector 102, which is one example of a first connection portion, is connected to a game process circuit 104 via data bus and address bus (control bus is omitted in FIG. 8) similar to the control bus 332, the address bus 336 and the data bus 340 of the game machine shown in FIG. 3. The game process circuit 104 has structure approximately the same as that the game process circuit 324 of the game machine 300 shown in FIG. 3, and therefore, the CPU 326, the oscillating circuit 352, the LCD controller 362, and the sound circuit 378 and etc. included in the game process circuit 104. Then, the game process circuit 104 and a working RAM 106 are coupled to each other by buses. Therefore, when the memory cartridge 30 is attached to the connector 102, the game process circuit 104 is coupled to the external memory 32 of the memory cartridge 30 via the buses.

A VRAM 108 is further coupled to the game process circuit 104, and the VRAM 108 includes the same memory structure as that of the VRAM included in the LCD display RAM 366 of the game machine 300 shown in FIG. 3.

Figure 10:
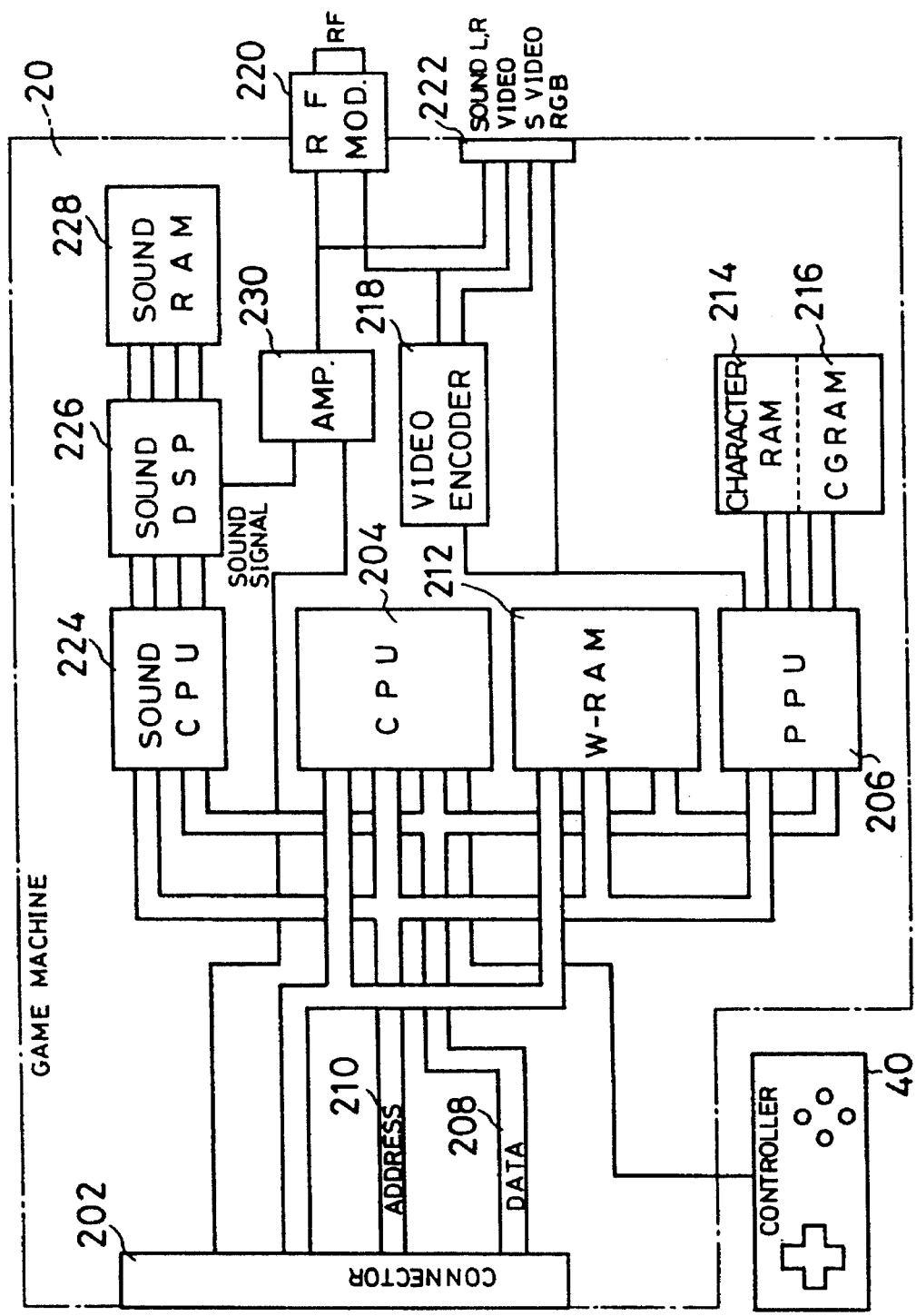
FIG. 10 is a block diagram showing a game machine shown in FIG. 1.

As similar to the game process circuit 324 of the game machine 300, the game process circuit 104 executes the game according to the program stored in the external memory 32. At this time, the controller data as shown in FIG. 7 being transferred from the game machine 20 which is shown in FIG. 10 in detail is applied to a controller interface 112 via a data bus 110. Therefore, the controller interface 112 converts the controller data shown in FIG. 7 into controller data which is the same as the controller data from the cross-key switch 312, push button switches 314 and 316, the start switch 318 and the select switch 320 of the game machine 300 shown in FIG. 9. Accordingly, in response to an operation of the controller 40 (FIG. 1) of the game machine 20, the movement and the action of the game character displayed on the monitor television (not shown)

can be controlled. Thus, as similar to the game process circuit 324 of the game machine 300 shown in FIG. 3, the game process circuit 104 outputs the sound signal and the video image data (dot signal) in accordance with the progress of the game, and the clock signal.

Furthermore, in the above described embodiment, the game process circuit 104 generates the video image data of the dots having different luminance or contrast; however, the game process circuit 104 may generate video image data of dots having different color tones.

The sound signal from the game process circuit 104 is directly sent to the game machine 20 (FIG. 10) via a connector 113 which is one example of a second connection portion and is for detachably connecting the adapter 10 to the game machine 20. The image data (dot data) is sent to a digital video signal interface 114. In brief, the digital video data interface 114 converts the video image data representative of one of four gradations (2 bits) for 8 dots in the horizontal direction, being applied from the game process circuit 104 in a bit-serial fashion, into bit parallel data of 2 byte, which is then stored in a buffer RAM 116. Furthermore, in a case where the video image data applied from the game process circuit 104 is the dot data of eight (8) color tones (3 bits), the digital video data interface 114 converts the video data for 8 dots in the horizontal direction into bit parallel data of 3 byte, which is then stored in the buffer RAM 116. At that time, the gradation data or the color tone data is converted into data of a type of character data for the game machine 20, and then, the character data is sequentially stored in the buffer RAM. Therefore, if the game machine 20 is coupled to the digital video data interface 114 via the data bus 110, the address bus 118, the control bus 110, the connector 113 and a connector 202 (FIG. 10), a video signal for a raster-scan monitor television (not shown) can be outputted from the game machine 20.

Figure 8:
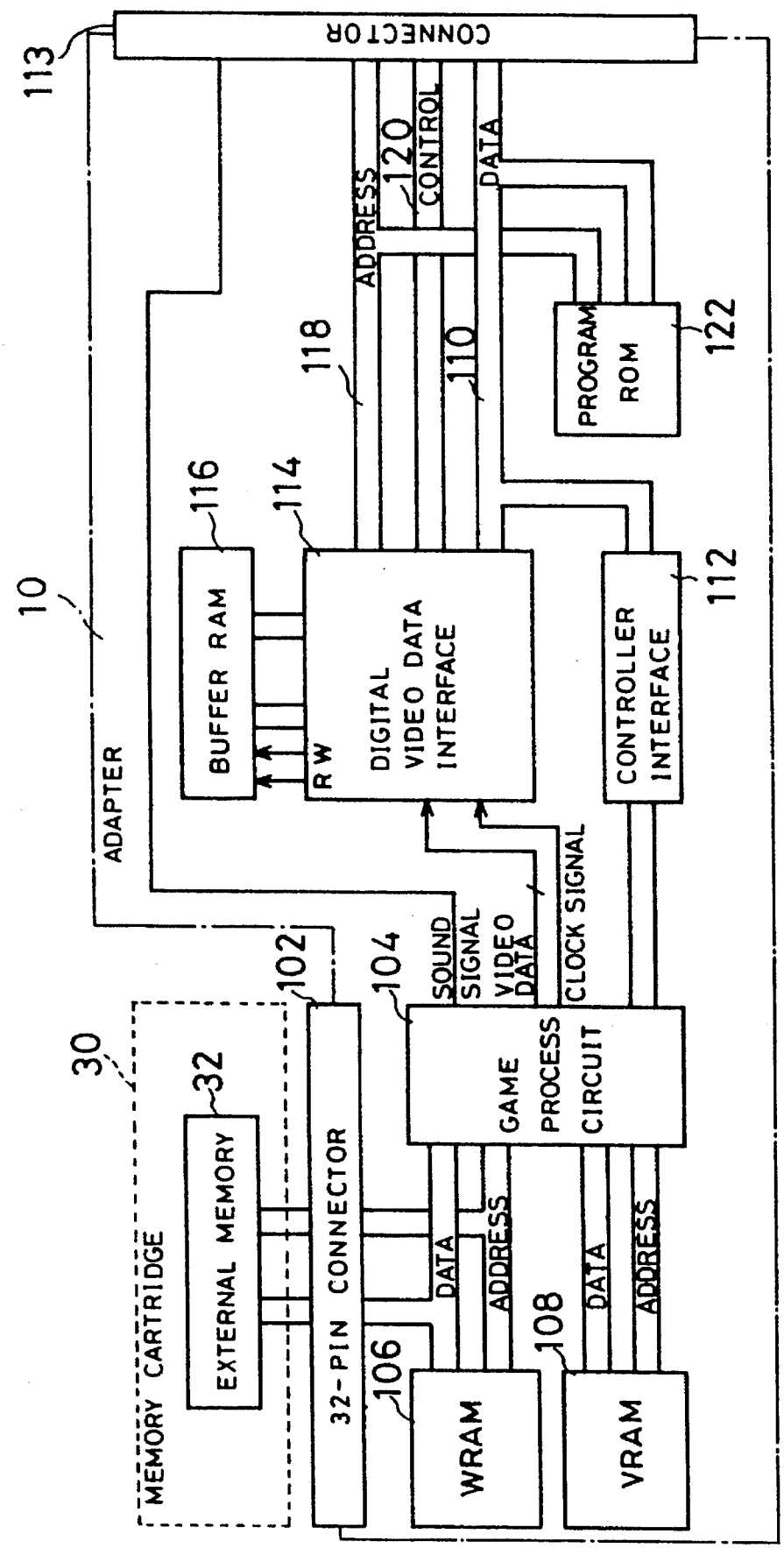
FIG. 8 is a block diagram showing an adapter shown in FIG. 1.

With referring FIG. 10, the game machine 20 includes a CPU 204 and a PPU 208. The CPU 204 and the PPU 206 are connected to the data bus 114 and the address bus 118 of the adapter 10 via data bus 208, and an address bus 210, the connector 202, and a connector 113 (FIG. 8). Furthermore, in association with the CPU 204 and the PPU 208, there is provided with a working RAM 212 which is also coupled to the data buses 208 and 210. Furthermore, the CPU 204 receives the controller data from the controller 40. The PPU 206 outputs by cooperating with a character RAM 214 and a CGRAM (Color Generator RAM) 216 video image data which can be displayed on a raster-scan type display on the basis of the character data applied from the digital video data interface 114 of the adapter 10, i.e., the buffer RAM 116. The video image data is applied to a video encoder 218. A video image signal from the video encoder 218 is applied to an RF modulator 220, or an output terminal 222.

In addition, the game machine 20 is provided with a sound CPU 224, a sound DSP (digital signal processor) 226 and a sound RAM 228, and sound signal from the sound DSP 226 or the sound signal;which is applied from the game process circuit 104 of the adapter 10 via the connector 202 is amplified by an amplifier 230, and then, applied to the RF modulator 220 or the output terminal 222.

Figure 11:
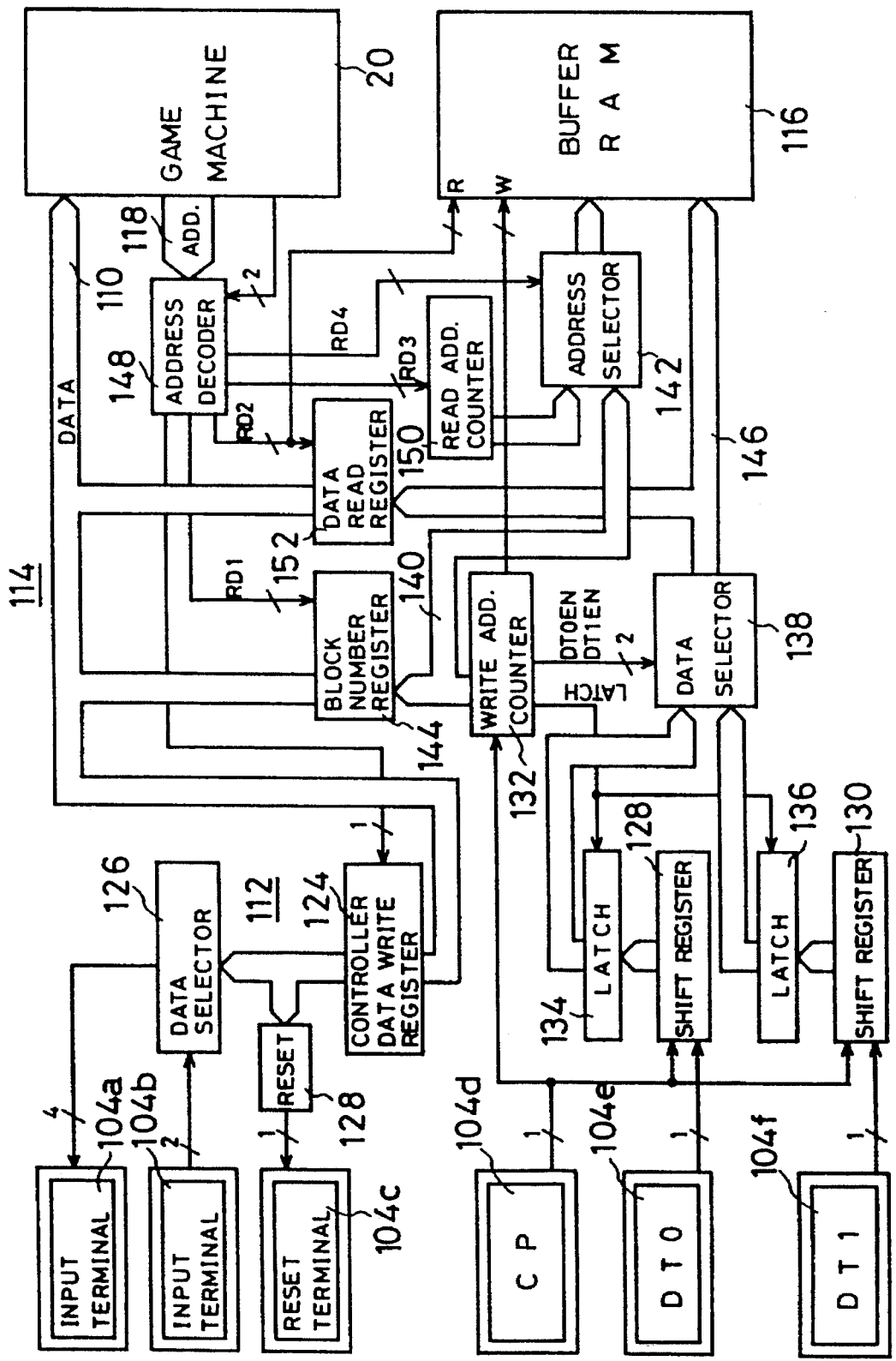
FIG. 11 is a block diagram showing a digital video signal interface shown in FIG. 8 in detail.

The controller interface 112 and the digital video data interface 114 included in the adapter 10 are shown in FIG. 11 in detail. The controller interface 112 includes a controller:data write register 124 to which the controller data sent from the CPU 204 of the game machine 20 is loaded through the data bus 110. The controller data loaded in the controller data write register 124 is applied to a data selector 126 and a reset signal generating circuit 128. The data selector 126 outputs the data loaded in the register 124 onto an input terminal 104a of the game process circuit 104. At this time, in order to convert the controller data from the controller 40 (FIG. 1 and FIG. 10) which is applied with a data format shown in FIG. 7 into the controller data having a data format shown in FIG. 9, the data selector 126 selectively derives the signal from the A button switch 408, B button switch 410, the select switch 412, the start switch 414 and the cross-key switch 402, and then, arranges the signals according to an order of the data format shown in FIG. 9, and thereafter, outputs the controller data by four (4) bits in response to a signal from an output terminal 104b of the game process circuit 104. Furthermore, the controller data is applied to the reset circuit 128 which includes a NAND circuit, for example, and applies a reset signal to a reset terminal 104c of the game process circuit 104 (which is a terminal for inputting a reset signal shown in FIG. 4) when a predetermined condition is satisfied by the controller data.

The digital video data interface 114 receives the clock pulse (CP) from an output terminal 104d of the game process circuit 104, and the dot data DT0 and DT1 from output terminals 104e and 104f of the game process circuit 104. The dot data DT0 from the output terminal 104e is loaded in an 8-bit shift register 128. The dot data DT1 from the output terminal 104f is loaded in an 8-bit shift register 130. The shift registers 128 and 130 are utilized for converting the dot data DT0 and DT1 which are respectively outputted in a bit-serial fashion into the character data of 8 bits in a bit parallel fashion, and operated in response to the clock pulse (CP). When the dot data DT0 and DT1 each being 8 bits are loaded in the shift registers 128 and 130, respectively, the dot data DT0 and DT1 are latched by data latches 134 and 136 in response to a latch signal applied from a write address counter 132 so as to become character data. The character data latched by the data latches 134 and 136 are applied to a data selector 138. In the above described case, the video image data having the gradation represented by 2 bits is generated by the game process circuit 104; however, even if the video data having the color tone represented by 3 bits is outputted from the game process circuit 104, in a similar manner, the dot data of a bit-serial fashion can be converted into 8-bit character data of a bit-parallel fashion. In such a case, the digital video data interface 114 receives the dot data DT0, the dot data DT1 and the dot data DT2 (not shown) respectively corresponding to red, green and blue from the output terminal 104e, the output terminal 104f and a further output terminal (not shown), and the dot data DT0–DT2 are respectively loaded in the shift register 128, the shift register 130 and a further shift register (not shown). When the dot data each being for 8 dots are loaded in the respective shift registers, outputs from the shift registers are latched by the data latch 134, the data latch 136 and a further data latch (not shown), and then, applied to the data selector 138 as character data. Thus, irrespective of the number of bits of the dot data generated by the game process circuit 104, it is possible to convert the same into the 8-bit character data of a bit-parallel fashion, which is then applied to the data selector 138.

In addition, the write address counter 132 is incremented in response to the clock pulse (CP) applied from the game process circuit 104 so as to generate a write address of 14 bits. Therefore, the above described latch signal is applied to the latches 134 and 136 at every timing that the write address counter 132 counts 8 clock pulses (CP). Accordingly, the 8-bit dot data DT0 and DT1 (character data) of a bit parallel fashion are applied from the data latches 134 and 136 to the data selector 138. A least significant bit A0 of the write address counter 132 and an inverted signal/A0 (in this specification, "/" is a bar symbol that means an inverted signal) are applied to the data selector 138 as enable signals DT0EN and DT1EN.

On the other hand, the write address from the write address counter 132 is applied to an address selector 142 through an address bus 140, and a block number register 144. Furthermore, the character data selectively outputted by the data selector 134 is applied to the buffer RAM 116 through a data bus 148.

Figure 12:
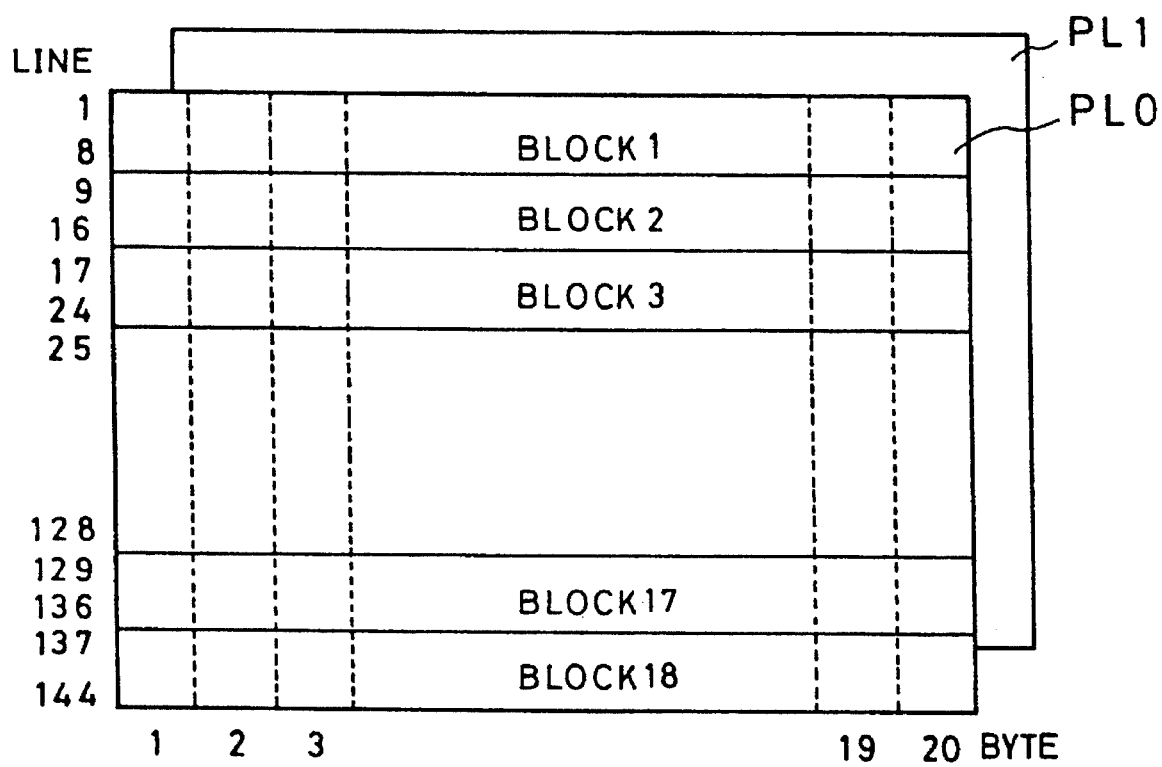
FIG. 12 is an illustrative view showing planes for explaining two (2) dot data outputted from the game process circuit shown in FIG. 8.

Now, a reason why the two kinds of the dot data DT0 and DT1 are outputted from the game process circuit 104 is as follows: A memory format of the game machine 300 is shown in FIG. 6, but the VRAM format of FIG. 8 indicates only a given plane of one background picture. In actual, two sheets of planes, i.e. a plane PL0 and a plane PL1 are formed in the VRAM to display the gradation represented by the 2 bits, as shown in FIG. 12 or FIG. 15. The dot data DT0 is dot data of a front plane PL0, and the dot data DT1 is dot data of a rear plane PL1. Therefore, in FIG. 11 embodiment, the two shift registers 128 and 130 are utilized for individually converting the two dot data DT0 and DT1 into the character data, and by selecting the character data by the data selector 138, the character data for the two sheets of planes PL0 and PL1 are written in the buffer RAM 118. Furthermore, in a case where the dot data DT0, DT1 and DT2 (not shown) respectively corresponding to red, green and blue are outputted by the game process circuit 104, three sheets of planes PL0, PL1 and PL2 (not shown) are formed in the VRAM in corresponding to red, green and blue. Then, the dot data DT0–DT2 generated on the basis of the respective planes are subjected to a serial-parallel conversion by the shift registers, and the character data are selected by the data selector, whereby the character data for the three sheets of planes PL0, PL1 and PL2 (not shown) are written in the buffer RAM 116.

Furthermore, the block number register 144 shown in FIG. 11 decodes the write address from the write address counter 132 and applies a block number corresponding to the write address to the game machine 20 through the data bus 110. The block number means the number indicative of any one of block 1—block 18 shown in FIG. 12. If the LCD panel 304 of the game machine 300 is constituted by 144 dots in the vertical direction (longitudinal direction), the vertical direction (longitudinal direction) of the LCD panel 304 is divided into 18 (=144÷8) because each game character is constituted by 8×8 dots. Such the block number is applied from the block number register 144 to the game machine 20. Then, the character data for each block are written in the buffer RAM 118 as shown in FIG. 13. In addition, a storage capacity of the buffer RAM 118 is approximately ¼ of a storage capacity of the VRAM, and therefore, the buffer RAM 118 is read-out by the game machine 20 at every time that one of the blocks shown in FIG. 13 is completed. Therefore, the storage capacity of the buffer RAM 118 may be small.

As described above, if an ideal data transmission is performed between the buffer RAM 118 and the working RAM 212, the buffer RAM 118 may have a storage capacity for a single block. However, the data transmission from the buffer RAM 118 to the working RAM 212 can not be performed during a time when the CPU 204 of the game machine 20 executes an interrupt NMI (described later) having a highest priority. Therefore, in view of the character data (for approximately 1.7–1.8 blocks) stored in the buffer RAM 118 in executing the interrupt NMI, it is desirable that the buffer RAM 118 has a storage capacity of four blocks.

On the other hand, address data is applied to an address decoder 148 from the game machine 20 via an address bus 118. The address decoder 148 decodes the address data, and outputs signals RD1, RD2, RD3 and RD4. The signal RD3 from the address decoder 148 is applied to a read address counter 150 which is incremented at a timing that the signal RD3 is received, and outputs a read address for the buffer RAM 118. The read address is applied to an address selector 142 which receives the signal RD4 from the address decoder 148, and selectively applies the write address from the write address counter 132 or the read address from the read address counter 150 to the buffer RAM 116. Therefore, at a time that the character data is to be written in the buffer RAM 116, the write address is, of course, selected, and at a time that the character is to be read from the buffer RAM 116 to the game machine 20, the read address is selected. Therefore, the write signal (W) from the write address counter 132, and the read signal (R) from the address decoder 148 are respectively applied to the buffer RAM 116. Then, the data read-out from the buffer RAM 116 is loaded in a read data register 152, and then, applied to the game machine 20 therefrom via the data bus 110.

The character read-out the buffer RAM 116 is stored in the working RAM 212 (FIG. 10) of the game machine 20. The working RAM 212 includes a frame buffer area 1, a frame buffer area 2 and color data areas 0–3 as shown in FIG. 14. A reason why two frame buffer areas 1 and 2 are formed in the working RAM 212 is as follows: In a state where the frame buffer area 1 is completely filled by the character data to be transferred to the character RAM 214, if the character data to be stored in the frame buffer area further occurs, a second frame buffer area is required to store the further character data. Next, when the frame buffer area 2 is completely filled by the character data to be transferred to the character RAM 214, since the character data of the frame buffer area 1 has been transferred to the character RAM 214, no third frame buffer area is required. In the respective buffer areas, the character data of the front plane shown in FIG. 15 and the character data of the rear plane shown in FIG. 15 are alternately stored in accordance with an order that the character data is read-out the buffer RAM 116. On the other hand, as described above, in the buffer RAM 116, the dot data DT0 of the plane PL0 and the dot data DT1 of the plane PL1 shown in FIG. 12 are sequentially written. The dot data is outputted continuously from a left end dot to a right end dot of the LCD panel 304 and in synchronous with a line of the horizontal direction. In contrast, the character data is stored in a character data format as shown in FIG. 15 in the frame buffer areas. More specifically, in succeeding to the character data for 8 dots in the horizontal direction of the plane PL0, which is stored in an n-th address of the frame buffer area, in an (n+1)th address, the character data for 8 dots in the horizontal direction of the plane PL1 at the same horizontal position and the same horizontal line as that of the character data stored in the n-th address are stored. Succeedingly, in an (n+2)th address, the character data for 8 dots to be displayed on the same horizontal position but a next horizontal line as the character data for 8 dots in the horizontal direction being stored in the n-th address is stored. Thus, the character data stored in a character data format is not stored continuously from a left end dot to a right end dot of the LCD panel 304. Therefore, in order to make the character data to be stored in the frame buffer areas of the working RAM 212 such that the character data can be sequentially outputted by simply designating sequential addresses in reading-out the character data from the buffer RAM 116 of the game machine 20, a scheme is to be incorporated in the write address with respect to the buffer RAM 116. Therefore, in FIG. 11 embodiment, as shown in FIG. 16 in detail, methods for applying the read address and the write address are changed from each other.

Figure 16:
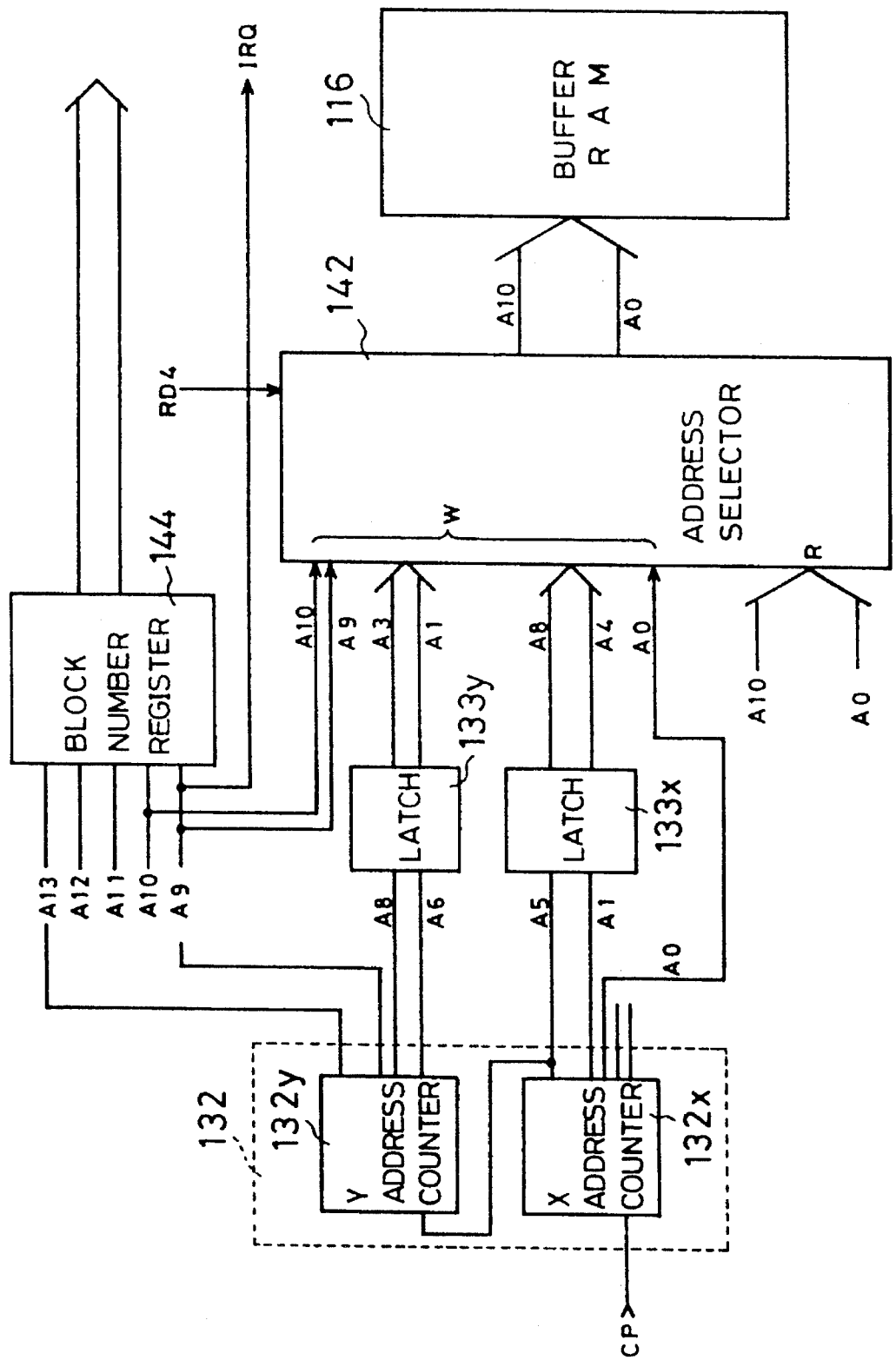
FIG. 16 is a partial block diagram showing an address conversion in FIG. 11 embodiment.
Figure 17:
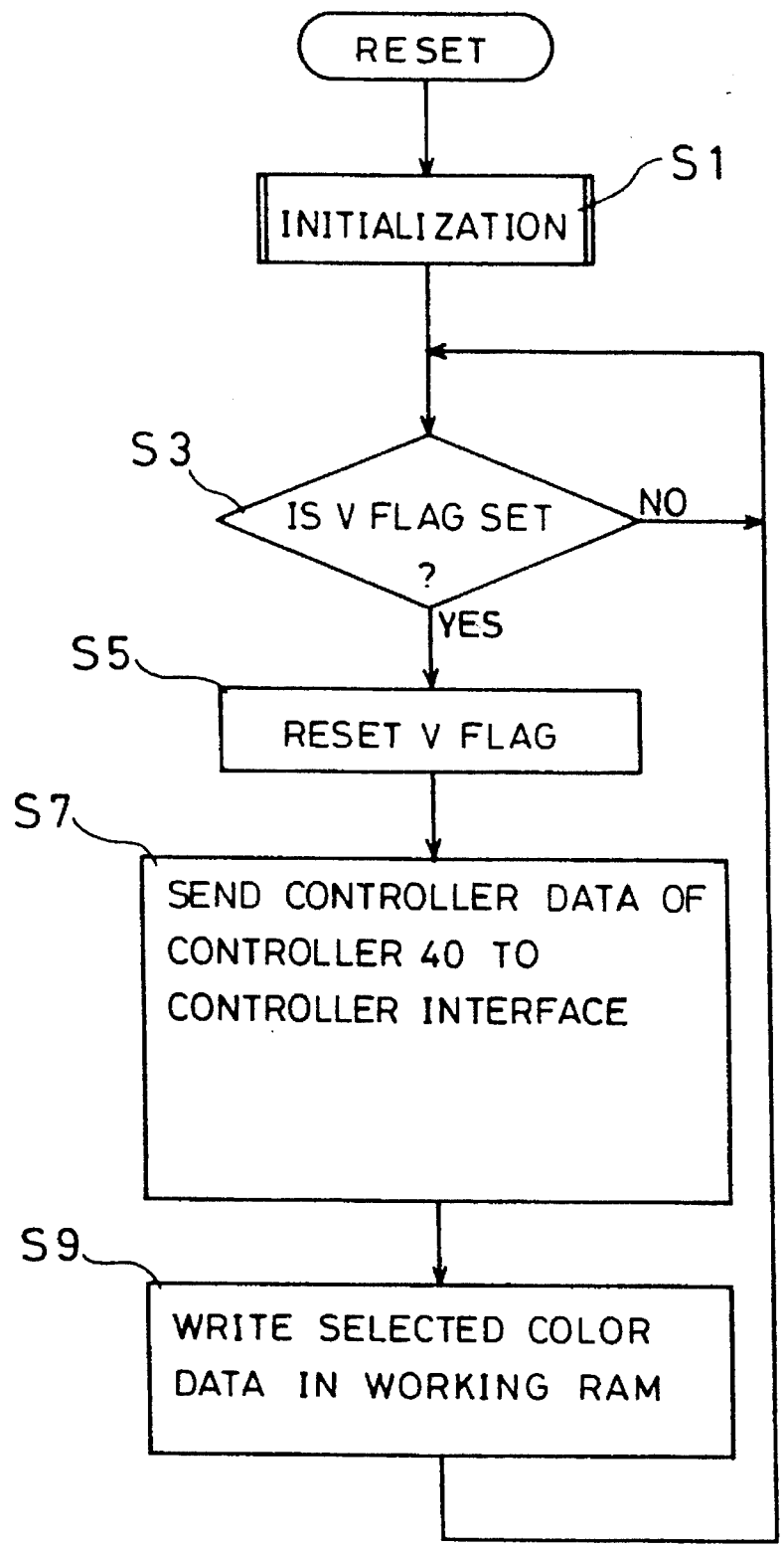
FIG. 17 is a flowchart showing an operation of a CPU shown in FIG. 10.

With referring FIG. 16, the write address counter 132 which receives the clock pulse (CP) includes an X address counter 132x and a Y address counter 132y, the former being incremented by the clock pulse (CP), and the latter being incremented in response to a carry signal from the X address counter 132x. Address data of 6 bits is outputted from the X address counter 132x, and address data of 8 bits is outputted from the Y address counter 132y. A least significant bit A0 of the address data from the X address counter 132x is applied to the address selector 142 as the least significant bit A0 of the write address. Then, remaining bits A1–A5 of the X address counter 132x are latched by an address latch 133x, and 3 bits A6–A8 of the Y address counter 132y are latched by an address latch 133y. The 3 bits A6–A8 latched by the address latch 133y are applied as a lower order bits A1–A3 of the write address, and the bits A1–A5 latched by the address latch 133x are applied as upper order bits A4–A8. Then, 2 bits A9 and A10 out of the remaining bits A9–A13 of the Y address counter 132y are applied as uppermost bits of the write address. In addition, the bits A9–A13 from the Y address counter 132y are applied to the block number register 144. The bit A9 is applied to the game machine 20 (FIG. 11) as an interrupt request signal IRQ.

On the other hand, address A0–A10 from the read address counter 150 (FIG. 11) is applied to the address selector 142. Thus, an address conversion is performed, and the character data of the plane PL0 and the character data of the plane PL1 are written in the respective block memory areas (FIG. 13) for each block. Therefore, by reading-out the buffer RAM 116 by the read address from the read address counter 150 which is sequentially incremented, the character data of the plane PL0 and the character data of the plane PL1 shown in FIG. 15 are written in one of the frame buffer area 1 and the frame buffer area 2 of the working RAM 212 (FIG. 14) in a character data format on the basis of a data amount of the character data stored in the frame buffer area 1.

Now, with referring FIG. 17–FIG. 20, an operation of the CPU 204 (FIG. 10) of the game machine 20 will be described. When the game machine 20 is reset, in a step S1 shown in FIG. 17, a predetermined initialization is performed, and thereafter, in a step S3, the CPU 204 determines whether or not a V flag is set. If it is determined in the step S3 that the V flag is set, in a next step S5, the V flag is reset, and then, the process proceeds to a step S7 in which the controller data from the controller 40 (FIG. 1 and FIG. 10) is sent to the adapter 10. The controller data is automatically read-in with a predetermined time interval by a hardware read-in circuit (not shown) provided in the CPU 204 of the game machine 20, for example, and temporarily stored in a controller register (not shown). Therefore, in the step 87, the controller data temporarily stored in the controller register may be simply transferred to the adapter 10, In response to that the controller data is sent to the adapter 10, the controller interface 112 (FIG. 8) of the adapter 10 converts the control data as applied into the same controller data as that of the game machine 300 so as to apply the same to the game process circuit 104. Then, in a step S9, the CPU 204 selects arbitrarily color data from color data which are set in advance in the program ROM 122 provided in the adapter 10, and fetches the same in the color data area (FIG. 14) of the working RAM 212. That is, the LCD panel 304 of the "Game Boy (trademark)" is a monochrome display, while the game machine 20 such as "Super NES (trademark)" applies a color video signal to a color monitor television. Therefore, it is necessary to add the color data to the monochrome video data. Then, the program ROM 122 is provided in the adapter 10, and color data combinations of m sets being selectable are stored in advance in the program ROM 122, and according to a selection by the player who utilizes the game machine 20 or a predetermined method set in advance, any one of the color data combinations of m is selected from the program ROM 122 and the same is written in the working RAM 212.

Furthermore, in a case where as the memory cartridge 30 and the game process circuit 104 within the adapter 10, devices having a color displaying ability but with lesser number of colors than that of the game machine 20 are selected, the color data may be added such that arbitrary colors out of the same number of colors as that of the game machine 20 can be displayed.

Figure 19:
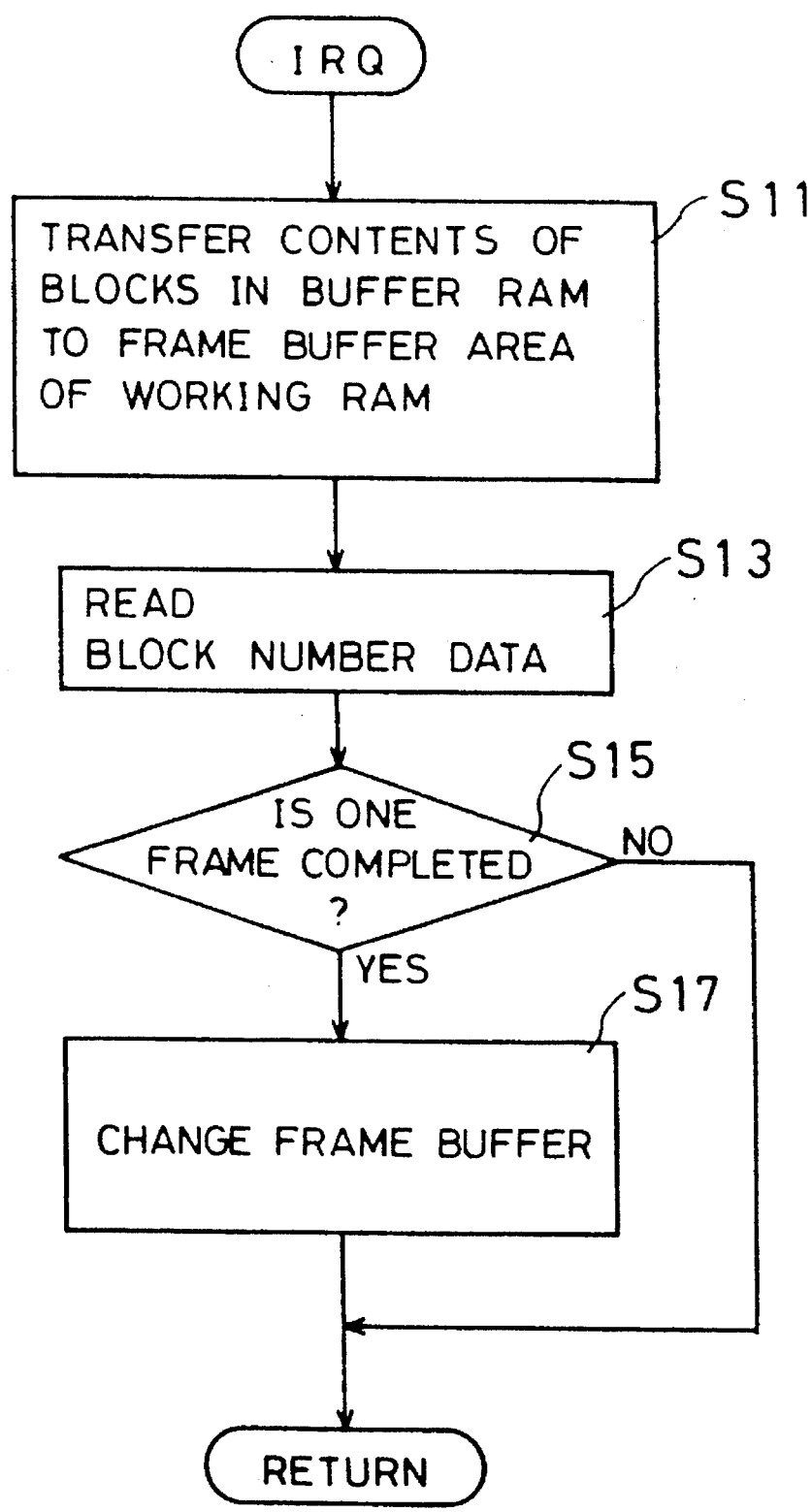
FIG. 19 is a flowchart showing an operation of the CPU shown in FIG. 10 in response to a first interrupt signal.

If the interrupt request signal IRQ is inputted to the CPU 204 of the game machine 20 as shown in FIG. 16, the CPU 204 executes an interrupt process shown in FIG. 19. Since the interrupt request signal IRQ is the second most significant bit A9 of the write address as described in the above, a fact that the signal IRQ is outputted means that the character data is completely stored in one block of the buffer RAM 116 shown in FIG. 13. Therefore, the game machine 20 becomes to execute an operation shown in FIG. 19 at every time that the character data is completely written in the block area of the buffer RAM 116. That is, in a step S11 of FIG. 19, a content of the block buffer, i.e., the block area of the buffer RAM 116 in which the character data is completely written is transferred to the frame buffer, i.e., the frame buffer area 1 or the frame buffer area 2 of the working RAM 212 by means of a direct memory access (DMA). In addition, the number of byte to be transferred is 320 (=160 dots×2 bits×8 lines/8 bits). Then, in a next step S13, the block number data from the block number register 144 is read-in. Thereafter, in a step S15, it is determined whether or not the block number data becomes "18", that is, whether or not the data transfer for one frame is completed. If the data transfer for one frame is completed, the frame buffer area is changed (step S17).

Thus, the character data and the color data are stored in the working RAM 212. Then, in response to the interrupt signal NMI having the highest priority which is generated at the beginning of the V blanking of the raster-scan display (not shown) which is connected to the game machine 20, the CPU 204 executes an operation shown in FIG. 20. More specifically, in response to the interrupt signal NMI, in a step S19 of FIG. 20, the CPU 204 transfers a content of the frame buffer area of the working RAM 212 in which the character data has been stored to the character RAM 214 (FIG. 10) by means of the DMA. The number of byte to be transferred is 5760 (=160 dots×2 bits×8 lines×18 blocks/8 bits). In a next step S21, the CPU 204 transfers the four color data being stored in the color data area of the working RAM 212 to the CGRAM 216 (FIG. 10). Each of the color data 0 to the color data 3 is data of 16 bits. Then, in a next step S23, the V flag is set, and then, the process returns to the main routine.

Although the writing the data from the game process circuit 104 (FIG. 8) in the buffer RAM 116 and the reading the data from the buffer RAM 116 by the game machine 20 can be simultaneously performed, a time of the write signal (shown in FIG. 21) from the write address counter 132 is made sufficiently longer than a time of the read signal from the address decoder 148. Therefore, during a time that the data transfer is performed according to the DMA by the game machine 20 is performed, the write operation to the buffer RAM 216 is temporarily stopped for a time of the read signal R; however, since the time of the write signal W is sufficiently long, the writing the data into the buffer RAM 116 is not hindered by the reading of the data. Accordingly, the character data of the blocks can be surely written in the buffer RAM 116. Furthermore, in order to make the buffer RAM 116 possible to store the character data applied from the data selector 138 during the process of the NMI interrupt, the buffer RAM 116 has a storage capacity of 4 blocks as described above.

Figure 20:
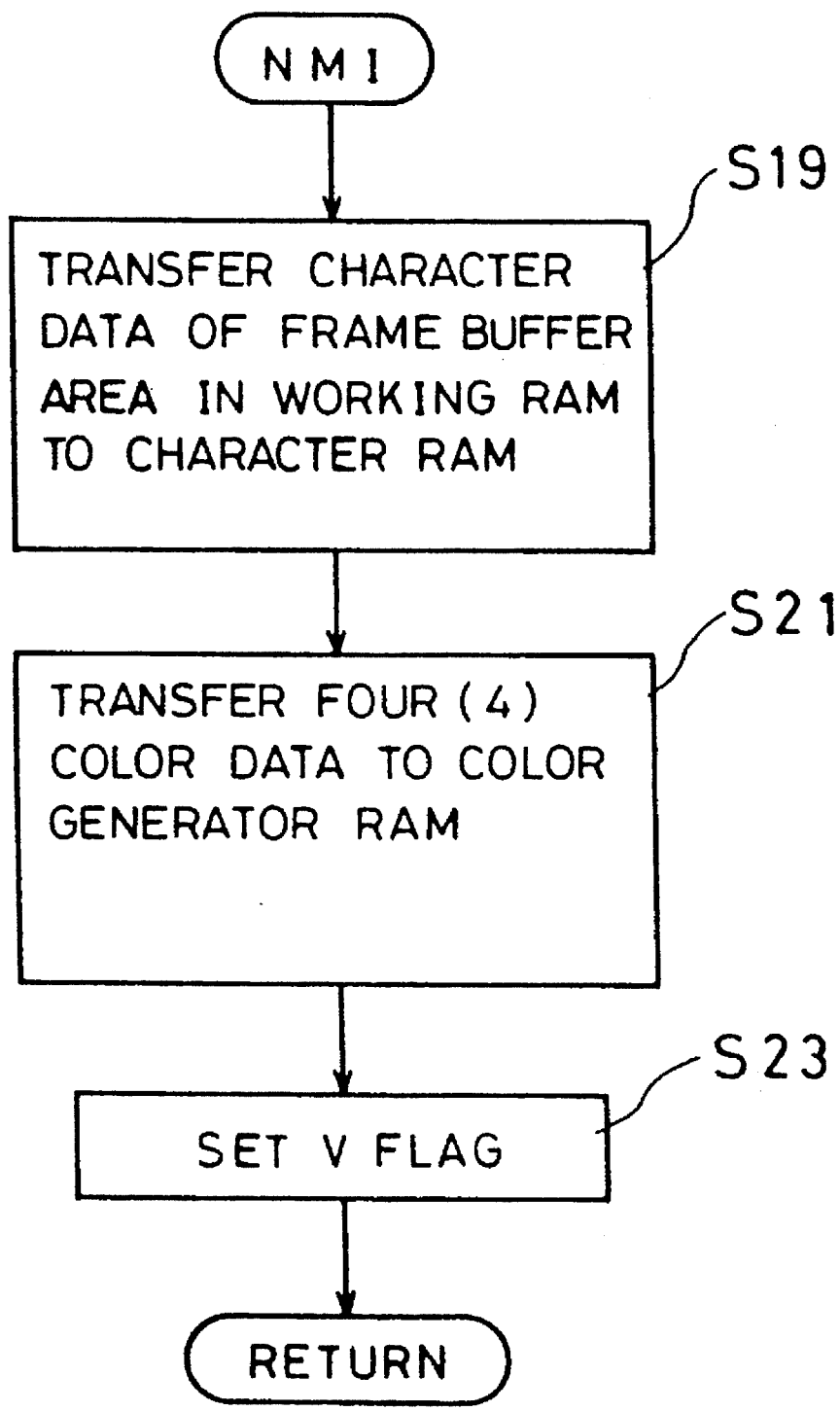
FIG. 20 is a flowchart showing an operation of the CPU shown in FIG. 10 in response to a second interrupt signal.

The character data is stored in the character RAM as shown in FIG. 20, and the color data is stored in the CGRAM, and therefore, the data of the character having the color data is outputted by the PPU (FIG. 10), and the same is encoded by the video encoder 218, whereby the color video signal is outputted from the game machine 20.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A display information conversion apparatus for making a storage medium which stores a first program executed by a first information processing apparatus which is constituted to display a video image on a dot-matrix display to be applied to a second information processing apparatus which is constituted to display a video image on a raster-scan display, comprising:

a first connection portion to which said storage medium is detachably attached;

a second connection portion for detachably attaching said display information conversion apparatus to said second information processing apparatus;

an information processor for executing said first program of said storage medium being attached to said first connection portion to generate first video image information for the dot-matrix display;

a video image converter for converting said first video image information into second video image information for the raster-scan display; and transfer circuitry for transferring said second video image information converted by said video image converter to said second information processing apparatus via said second connection portion.

2. An image information conversion apparatus according to claim 1, wherein said first video image information includes bit-serial data, and said video image converter includes a serial/parallel converter for converting said bit-serial data into bit-parallel data.

3. A video information conversion apparatus according to claim 2, wherein said video image converter includes a buffer memory and write circuitry for writing said bit-parallel data into said buffer memory, and said transfer circuitry includes read circuitry for reading said bit-parallel data from said buffer memory, and said second information processing apparatus converts said bit-parallel data into a video signal for said raster-scan display.

4. A display information conversion apparatus according to claim 1, wherein said first information processing apparatus includes information processing means for executing said first program, and said information processor in said display information conversion apparatus is the same as information processing means provided in said first information processing apparatus.

5. A display information conversion apparatus according to claim 1, further comprising operation means provided in association with said second information processing apparatus, and operation information converting means for converting operation information from said operation means into operation information adapted to said information processor.

6. A display processing system, comprising:

a storage medium for storing a program executed by first information processing apparatus which is constituted to display a video image on a dot-matrix display;

a second information processing apparatus constituted to display a video image on a raster-scan display;

an information processor for executing said first program of said storage medium to generate first video image information for said dot-matrix display;

a video converter for converting said first video image information into second video image information for said raster-scan display; and transfer circuitry for transferring said second video information converted by said video converter to said second information processing apparatus.

7. A video information conversion apparatus for making a memory including a game program for a first game machine which displays a game video image on a dot-matrix display to be applied to a second game machine which displays a game video image on a raster-scan display, comprising:

a first connection portion to which said memory is detachably attached;

a second connection portion for detachably attaching said display information conversion apparatus to said second game machine;

a game processor for executing said game program of said memory attached to said first connection portion to generate dot data for said dot-matrix display; and a data converter for converting said dot data into character data for said raster-scan display; and transfer circuitry for transferring said character data converted by said data converter to said second game machine through said second connection portion.

8. A display information conversion apparatus for making a storage medium which stores in a non-volatile fashion a first program executed by a first information processing apparatus which is constituted to display a video image on the basis of a first specification to be applied to a second information processing apparatus which is constituted to display a video image on the basis of a second specification, comprising:

a first connection portion to which said storage medium is detachably attached;

a second connection portion for detachably attaching said display information conversion apparatus to said second information processing apparatus;

an information processor for executing said first program of said storage medium being attached to said first connection portion to generate first video image information for said first specification;

a video image converter for converting said first video image information into second video image information for said second specification; and transfer circuitry for transferring said second video image information converted by said video image converter to said second information processing apparatus via said second connection portion.

9. A display information conversion apparatus according to claim 8, wherein said video image converter includes a buffer memory for storing bit-parallel data in a digital manner, and write circuitry for converting video image information for said first specification into a form capable of being stored in said buffer memory, and for writing the same into said buffer memory, said transfer circuitry includes read circuitry for reading said bit-parallel data from said buffer memory, and said second information processing apparatus converts said bit-parallel data into a video image signal for displaying a video image on said raster-scan display.

* * * * *